United States Patent
Sajadi et al.

(10) Patent No.: US 7,257,223 B2
(45) Date of Patent: Aug. 14, 2007

(54) SPLITTER ASSEMBLY FOR A TELECOMMUNICATIONS SYSTEM

(75) Inventors: Ahmad R. Sajadi, Eagan, MN (US); Jennifer Miller, Farmington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 799 days.

(21) Appl. No.: 09/853,035

(22) Filed: May 10, 2001

(65) Prior Publication Data

US 2002/0168065 A1    Nov. 14, 2002

(51) Int. Cl.
H04M 1/00 (2006.01)
(52) U.S. Cl. .............................. 379/413.04; 439/76.1; 439/668; 361/736; 361/748
(58) Field of Classification Search ........ 379/325–332, 379/399.01–413.04; 439/512–522, 540.1–544; 361/719, 730, 742, 788, 796, 826
See application file for complete search history.

(56) References Cited

U.S. PATENT DOCUMENTS

| | | | | |
|---|---|---|---|---|
| 4,968,260 | A * | 11/1990 | Ingalsbe .................... | 439/76.1 |
| 5,714,718 | A | 2/1998 | Tanaka | |
| 6,137,866 | A * | 10/2000 | Staber et al. .......... | 379/413.04 |
| 6,181,004 | B1 | 1/2001 | Koontz et al. | |
| 6,438,226 | B1 * | 8/2002 | Guenther et al. ...... | 379/413.04 |
| 6,614,665 | B2 * | 9/2003 | Witty et al. ............. | 379/413.03 |
| 6,996,232 | B1 * | 2/2006 | Staber et al. .......... | 379/413.02 |
| 2002/0118820 | A1* | 8/2002 | Sinclair et al. ........ | 379/399.01 |
| 2002/0136392 | A1* | 9/2002 | Witty et al. ............. | 379/413.04 |
| 2002/0136396 | A1* | 9/2002 | Witty et al. ............. | 379/413.03 |

(Continued)

FOREIGN PATENT DOCUMENTS

EP    0 909 102 A2    4/1999

(Continued)

OTHER PUBLICATIONS

"BroadWire™ 240: High Density ADSL Splitter", *ADC Telecommunications, Inc.*, 8 pages (Sep. 2000).

(Continued)

*Primary Examiner*—Ramnandan Singh
(74) *Attorney, Agent, or Firm*—Merchant & Gould P.C.

(57) ABSTRACT

A telecommunications device including a chassis having a housing in which a plurality of splitter devices are contained. The housing includes top and bottom walls, front and back ends, and opposing sides. A circuit board is positioned at the back end of the housing. The circuit board includes a front face that faces toward the front end of the housing. The circuit board also includes an upper portion that extends higher than the top wall of the housing and a lower portion that extends lower than the bottom wall of the housing. First telecommunications connectors are mechanically coupled to the front face of the circuit board at the upper portion, and second telecommunications connectors are mechanically coupled to the front face of the circuit board at the lower portion. The chassis of the telecommunications device defines upper open side regions for allowing cables to be routed laterally from adjacent the sides of the chassis to the first telecommunications connectors. The upper open side regions are located above the top wall of the card housing and adjacent to the back end of the card housing.

32 Claims, 12 Drawing Sheets

U.S. PATENT DOCUMENTS

2006/0079135 A1* 4/2006 Vercruyssen et al. ....... 439/668

FOREIGN PATENT DOCUMENTS

| JP | 04340795 | 11/1992 |
|---|---|---|
| WO | WO 01/45432 A1 | 6/2001 |
| WO | WO 01/80574 A2 | 10/2001 |
| WO | WO 01/97532 A2 | 12/2001 |

OTHER PUBLICATIONS

"BroadWire™ 240-Port 19 Inch Installation Guide", *ADC Telecommunications, Inc.*, 14 pages (Oct. 2000).

"DSL POTS Splitter Shelf Company", *Corning Cable Systems LLC*, 8 pages (Sep. 2000).

"High Density xDSL Central Office Splitter: PS-1000 Series", *Wilcom*, 2 pages (Apr. 2000).

"Product Information", *mPhase Technologies*, 3 pages (no date).

"Product Release: Wilcom Announces Highest Density CO ADSL POTS Splitter Series", *Wilcom*, 2 pages (Nov. 6, 2000).

"PS-1103 ADSL Central Office Line Filter Shelf: Quick Step Installation Instructions for PS-1103 Shelf", *Wilcom*, 2 pages (Jun. 2000).

"PS-1103 CO POTS Splitter: High Density xDSL Central Office Splitter", *Wilcom*, 2 pages (Jul. 2000).

"PS-1103 CO POTS Splitter: High Density xDSL Central Office Splitter", *Wilcom*, 2 pages (Nov. 2000).

Co-pending U.S. Appl. No. 09/896,808, filed Jun. 29, 2001.

U.S. Appl. No. 09/549,133, filed Apr. 13, 2000.

"BroadWire™ 120: High Density ADSL Splitter", *ADC Telecommunications, Inc.*, 8 pages (Sep. 2000).

"BroadWire™ 528: High Density ADSL Splitter", *ADC Telecommunications, Inc.*, 8 pages (Sep. 2000).

"BroadWire™ 528-Port 23-Inch Central Office ADSL Splitter Chassis Installation Guide", *ADC Telecommunications, Inc.*, 17 pages (Aug. 2000).

Photos of prior art telecommunications device, 3 pp. (Applicants had knowledge of these photos prior to the filing of current application).

* cited by examiner

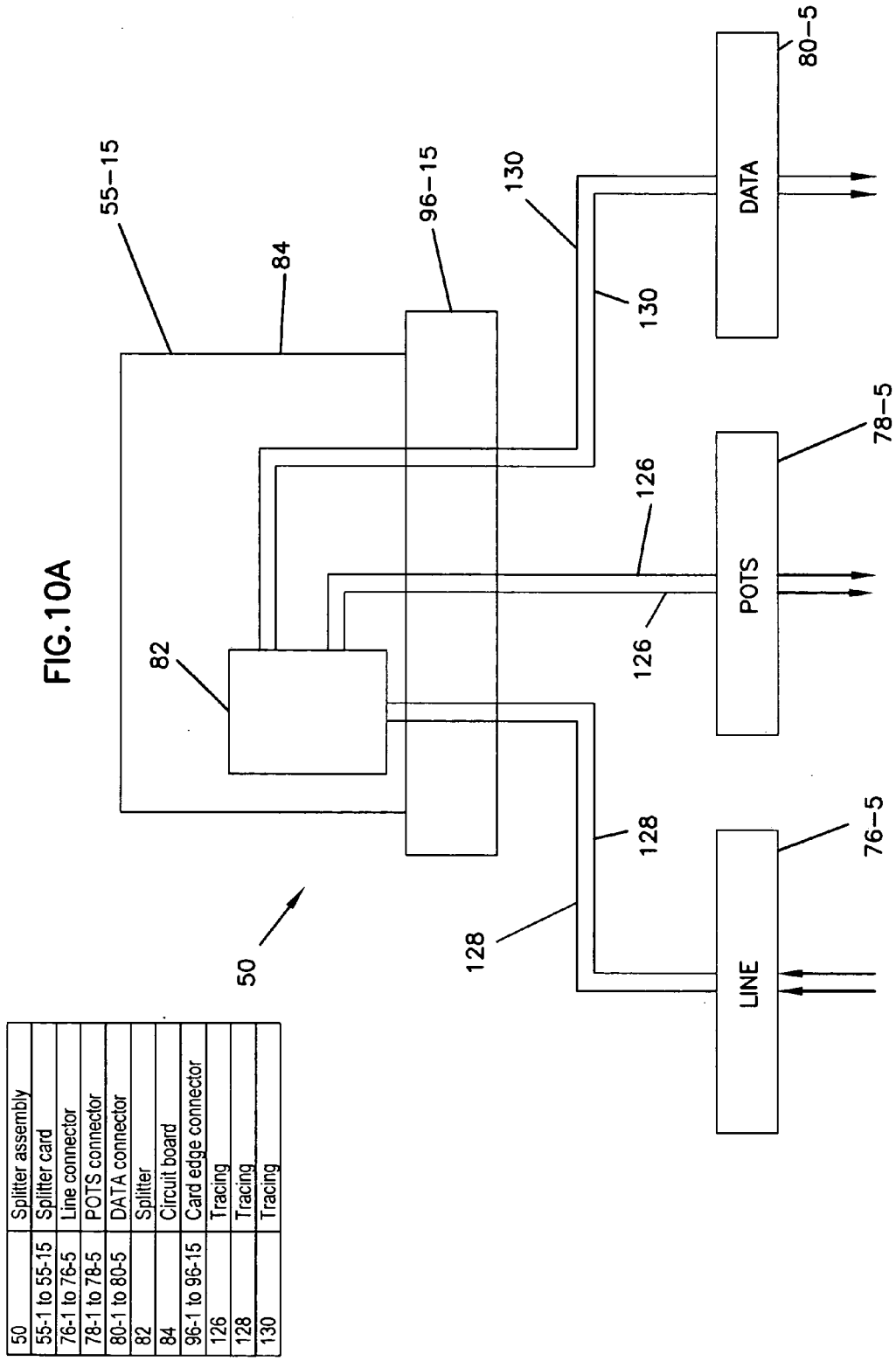

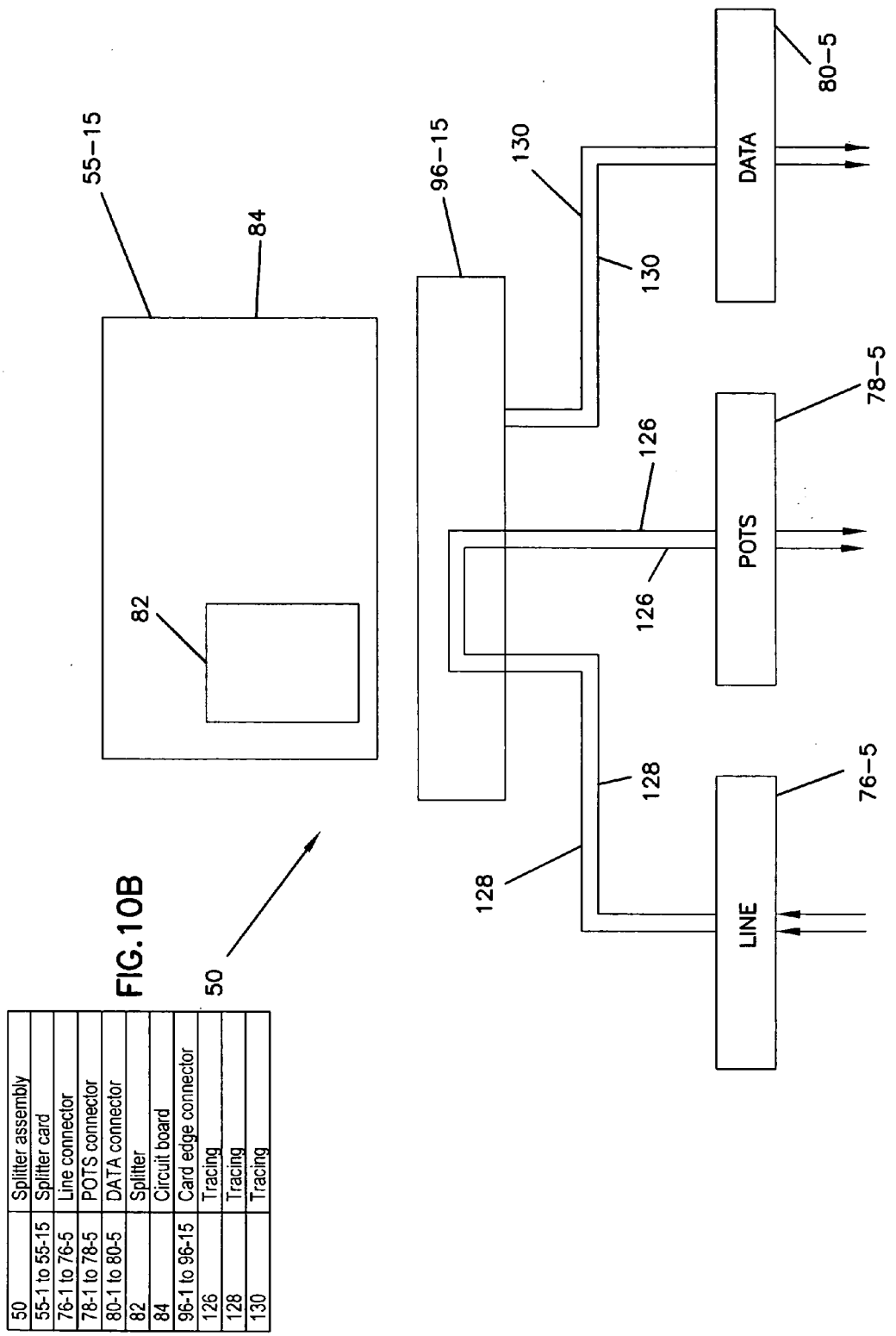

| 50 | Splitter assembly |
| 56 | Top wall |
| 104 | Rounded portions |
| 106 | Mounting flange |
| 108 | Fastener openings |
| 120 | Side region |
| 150 | Rack or cabinet |
| 151 | Fastner |
| 152 | Channel member |
| 154 | Opening |
| 162 | Lance |
| 170 | Cable |

SPLITTER ASSEMBLY FOR A TELECOMMUNICATIONS SYSTEM

FIELD OF THE INVENTION

The present invention relates generally to telecommunications devices. More particularly, the present invention relates to telecommunications devices for splitting telecommunications signals.

BACKGROUND OF THE INVENTION

Most telecommunications systems include cables (e.g., fiber optic cables or copper twisted pair cables) for interconnecting pieces of telecommunications equipment. For example, in a typical telephone carrier system servicing residences and/or businesses, cables are used to couple components such as an MDF (main distribution frame), a POTS (plain old telephone service) splitter for separating voice and data signals and a DSLAM (digital subscriber line access multiplexer). A telephone carrier's central office frequently includes multiple rows of telecommunications racks or cabinets. Each rack or cabinet is typically sized to hold several different pieces of telecommunications equipment. Racks typically have open fronts and open backs for allowing both front and back access to equipment, while cabinets typically have closed backs such that equipment is only accessible from the front. Often thousands of cables are used to interconnect the various pieces of telecommunications equipment mounted on the racks or cabinets.

Cable management is crucial at a location such as a telephone carrier's central office because of the large number of cables present. Cable management involves efficiently routing cables to minimize the space occupied by such cables. Cable management also involves routing cables in an orderly manner so as to reduce the likelihood of the cables becoming tangled. Ease of cabling is also a factor related to effective cable management.

In addition to cable management, other considerations relevant to the design of telecommunications equipment include manufacturing cost, assembly time, reliability and weight.

SUMMARY OF THE INVENTION

One aspect of the present invention relates to a telecommunications device including a chassis having a housing in which a plurality of splitter devices are contained. The housing includes top and bottom walls, front and back ends, and opposing sides. A circuit board is positioned at the back end of the housing. The circuit board includes a front face that faces toward the front end of the housing. The circuit board also includes an upper portion that extends higher than the top wall of the housing and a lower portion that extends lower than the bottom wall of the housing. First telecommunications connectors are mechanically coupled to the front face of the circuit board at the upper portion, and second telecommunications connectors are mechanically coupled to the front face of the circuit board at the lower portion. The chassis of the telecommunications device defines upper open side regions for allowing cables to be routed laterally from adjacent the sides of the chassis to the first telecommunications connectors. The upper open side regions are located above the top wall of the card housing and adjacent to the back end of the card housing.

Another aspect of the present invention relates to a telecommunications device including a chassis having a housing for containing a plurality of splitter devices. The housing includes opposing first and second walls and also includes front and back ends. A circuit board is positioned at the back end of the housing. The circuit board includes a first portion that extends beyond the first wall of the housing. Telecommunications connectors are mechanically coupled to a front face of the circuit board at the first portion of the circuit board. One or more cable management structures are located at an outer surface of the first wall of the card housing for use in managing cable connected to the telecommunications connectors.

A further aspect of the present invention relates to a telecommunications device including a chassis having a housing that contains a plurality of splitter devices. The housing includes top and bottom walls and also includes front and back ends. A circuit board is positioned at the back end of the housing. The circuit board includes an extension portion that extends beyond one of the top and bottom walls of the housing. Telecommunications connectors are mechanically coupled to a front face of the circuit board at the extension portion of the circuit board. The chassis defines open side regions for allowing cables to be routed laterally from adjacent the sides of the chassis to the telecommunications connectors. The open side regions are located adjacent to the back end of the housing.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

FIG. 10A is a schematic diagram of one circuit of the splitter assembly of FIG. 3 showing how a splitter card interfaces with the back plane of the splitter assembly;

FIG. 10B is a schematic view of the circuit of FIG. 10A with the splitter card disconnected from the back plane of the splitter assembly of FIG. 3;

Figure 1:
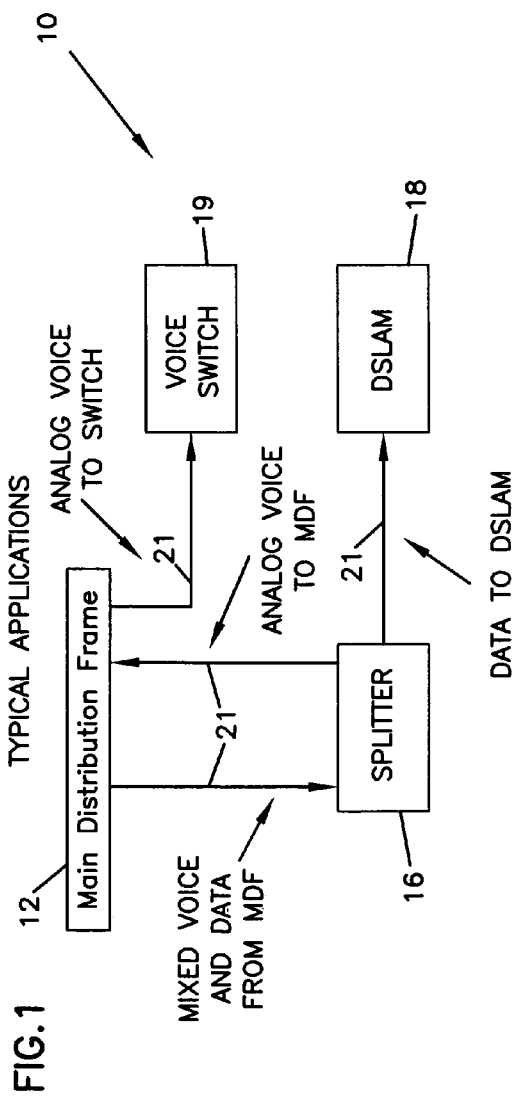
FIG. 1 is a diagram of a telecommunications system including an MDF, a splitter device, a DSLAM, and a voice switch.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION

In the following detailed description, references are made to the accompanying drawings that depict various embodiments in which the invention may be practiced. It is to be understood that other embodiments may be utilized, and structural and functional changes may be made without departing from the scope of the present invention.

Referring now to FIG. 1, a telecommunications system 10 is shown. The system 10 is representative of a telephone carrier's system for transmitting voice and data to residences and businesses. A main distribution frame (MDF) 12 is linked to a splitter device 16 (e.g., a card including POTS splitter circuits or ISDN splitter circuits). The MDF 12 is also linked to one or more DSLAM modules 18, and a voice switch 19 (e.g., a switch equipped with POTS interface line cards or ISDN interface line cards).

In use of the system 10, the splitter device 16 receives a mixed voice and data signal from the MDF 12. The splitter device 16 splits the mixed signal into split signals, and then filters the split signals. For example, one of the split signals can be filtered to provide a voice only signal (i.e., the high frequency data portion of the signal is filtered out), while the other split signal can be filtered to provide a data only signal (i.e., the low frequency voice portion of the signal is filtered out). The data only signals are passed from the splitter device 16 to the DSLAM 18. The voice only signals are passed from the splitter device 16 to the MDF 12 for transmission to the voice switch 19.

Figure 2:
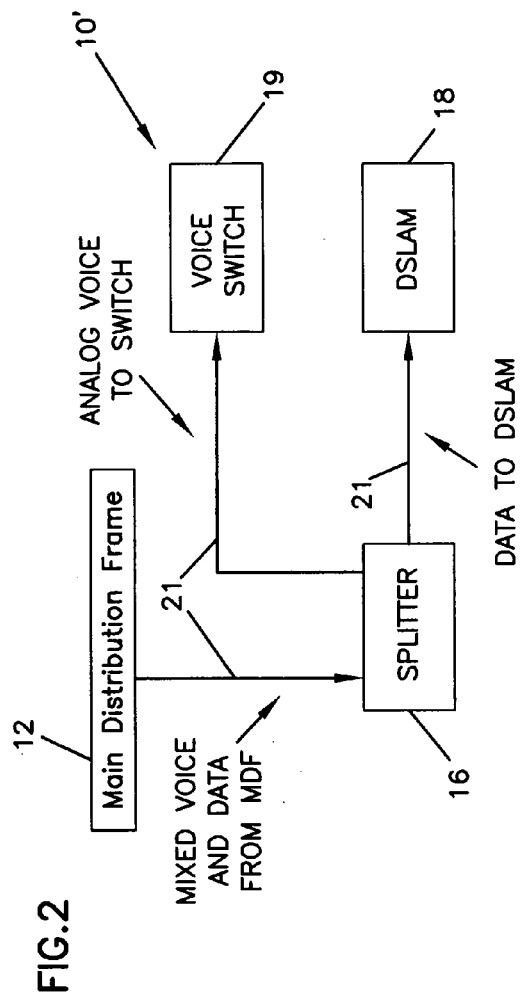
FIG. 2 is another telecommunications system including an MDF, a splitter device, a DSLAM, and a voice switch.

FIG. 2 shows a similar telecommunications system 10' having the same components as those described with respect to the telecommunications system 10 of FIG. 1. However, in the embodiment of FIG. 2, voice signals are transmitted directly from the splitter device 16 to the voice switch 19.

Referring still to FIGS. 1 and 2, the MDF 12, the POTS splitter device 16, the DSLAM 18 and the voice switch 19 are typically interconnected by cables 21. The cables 21 preferably each include multiple pairs of conductors for transmitting separate twisted pair signals. By way of example, the cables 21 can comprise 25 pair cables (i.e., cables each containing 25 pairs of wire conductors). Multi-pair connectors are used to provide interconnections between the cables 21 and the components of the telecommunications system 10. For example, multi-pair connectors are typically provided at the ends of the cables 21. The multi-pair connectors at the ends of the cables 21 are commonly coupled to corresponding multi-pair cable connectors mounted at the equipment to provide connections thereinbetween.

Exemplary multi-pair cable connectors suitable for use with telecommunications equipment as described above are sold by AMP of Harrisburg, Pa., a division of Tyco Electronics; or Kycon, Inc. of San Jose Calif. Connectors suitable for use with 25 pair cable typically include 25 pairs of contacts (i.e., 50 pins). This type of connector can be referred to as an "RJ-21X" connector or a "telco" connector. Often, 24 pairs of the contacts are available for transmitting signals, while one pair is grounded. Straight connectors and right-angle connectors are commonly used.

Figure 3:
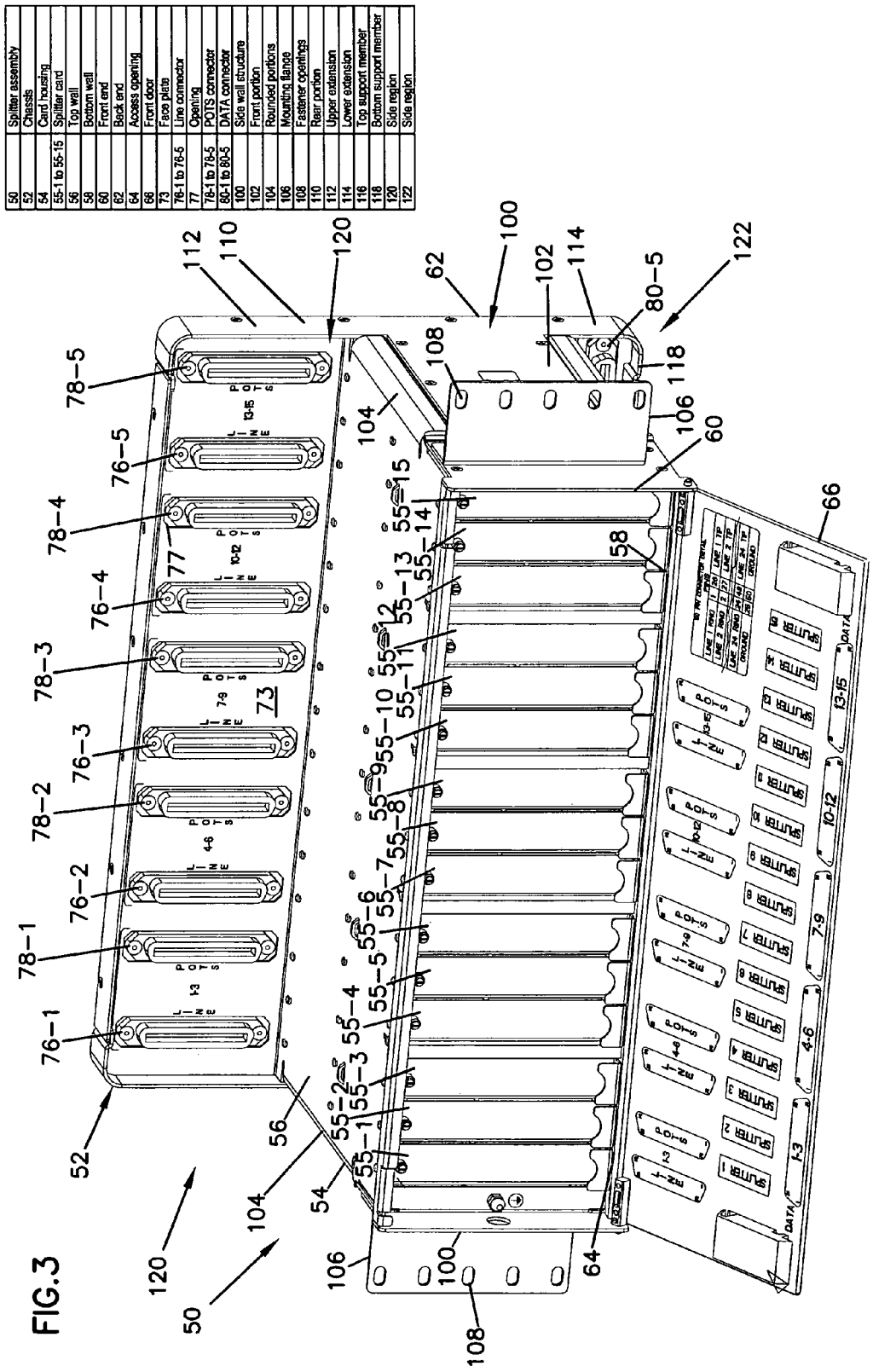
FIG. 3 is a perspective view of a splitter assembly constructed in accordance with the principles of the present invention, the splitter assembly includes a chassis that is shown fully loaded with splitter cards.
Figure 4:
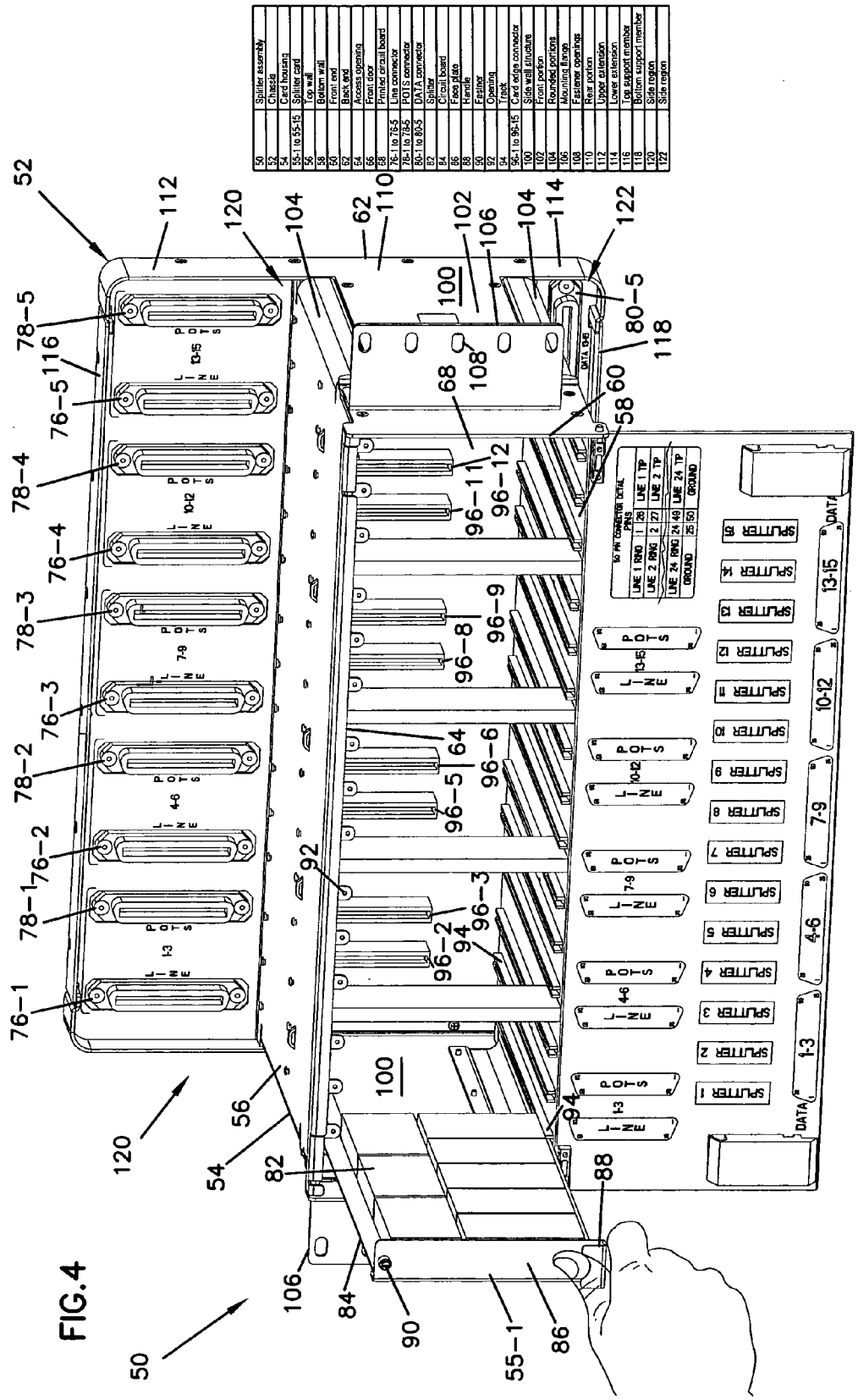
FIG. 4 is a perspective view of the splitter assembly of FIG. 3 with the splitter cards removed from the chassis.

FIG. 3 illustrates a splitter assembly 50 constructed in accordance with the principles of the present invention. The splitter assembly 50 includes a chassis 52 defining a generally rectangular card housing 54. The card housing 54 includes a top wall 56 positioned opposite from a bottom wall 58, and a front end 60 positioned opposite from a back end 62. A plurality of splitter cards 55-1 to 55-15 are shown removably mounted within the card housing 54. As best shown in FIG. 4, the front end 60 of the card housing 54 defines an access opening 64 for allowing the splitter cards 55-1 to 55-15 to be inserted into or removed from the card housing 54. The access opening 64 can be opened and closed by a pivotal front door 66. A connectorization diagram is provided on the inside surface of the front door 66.

Figure 5:
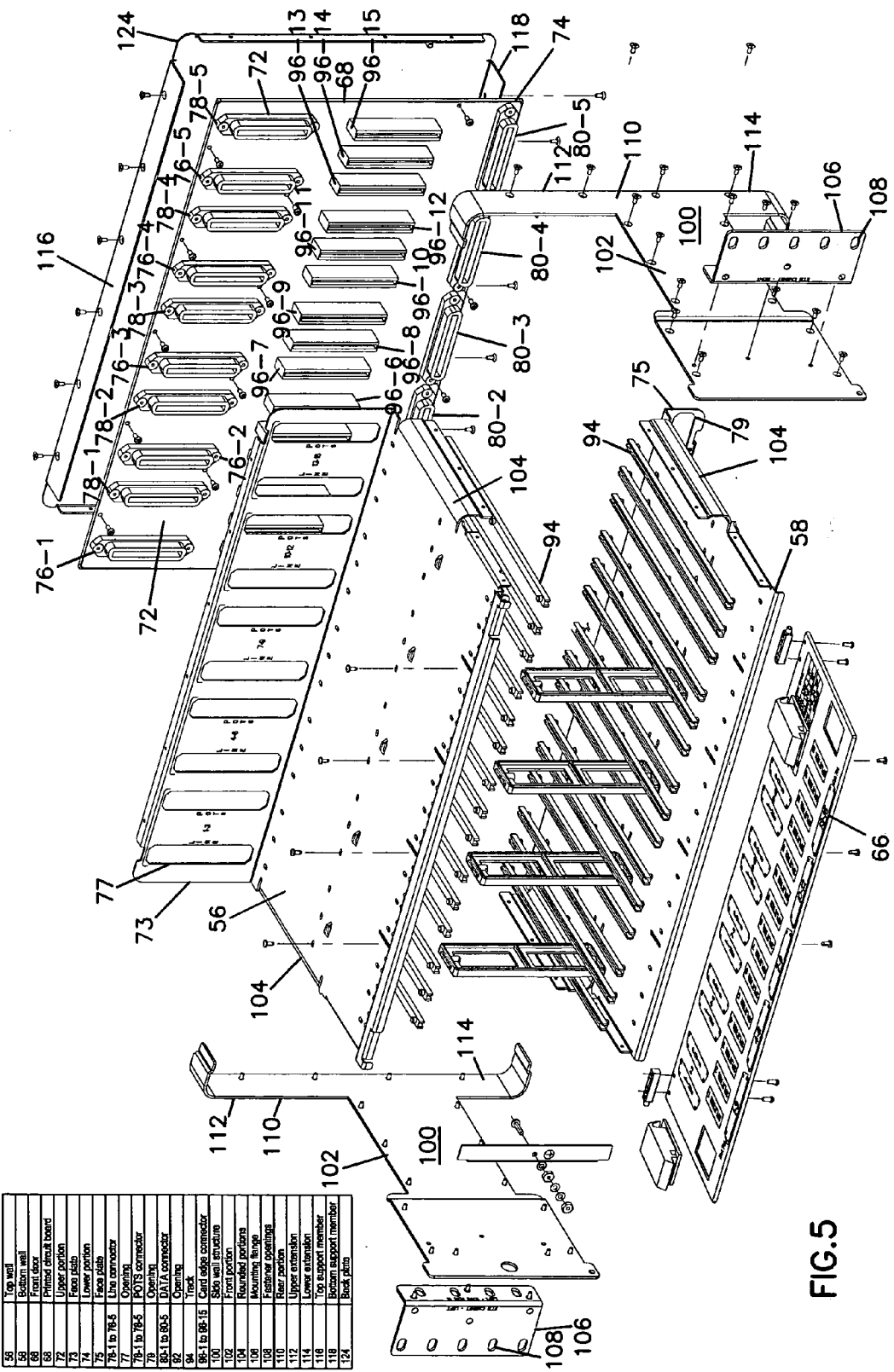
FIG. 5 is an exploded view of the splitter assembly of FIG. 3.
Figure 6:
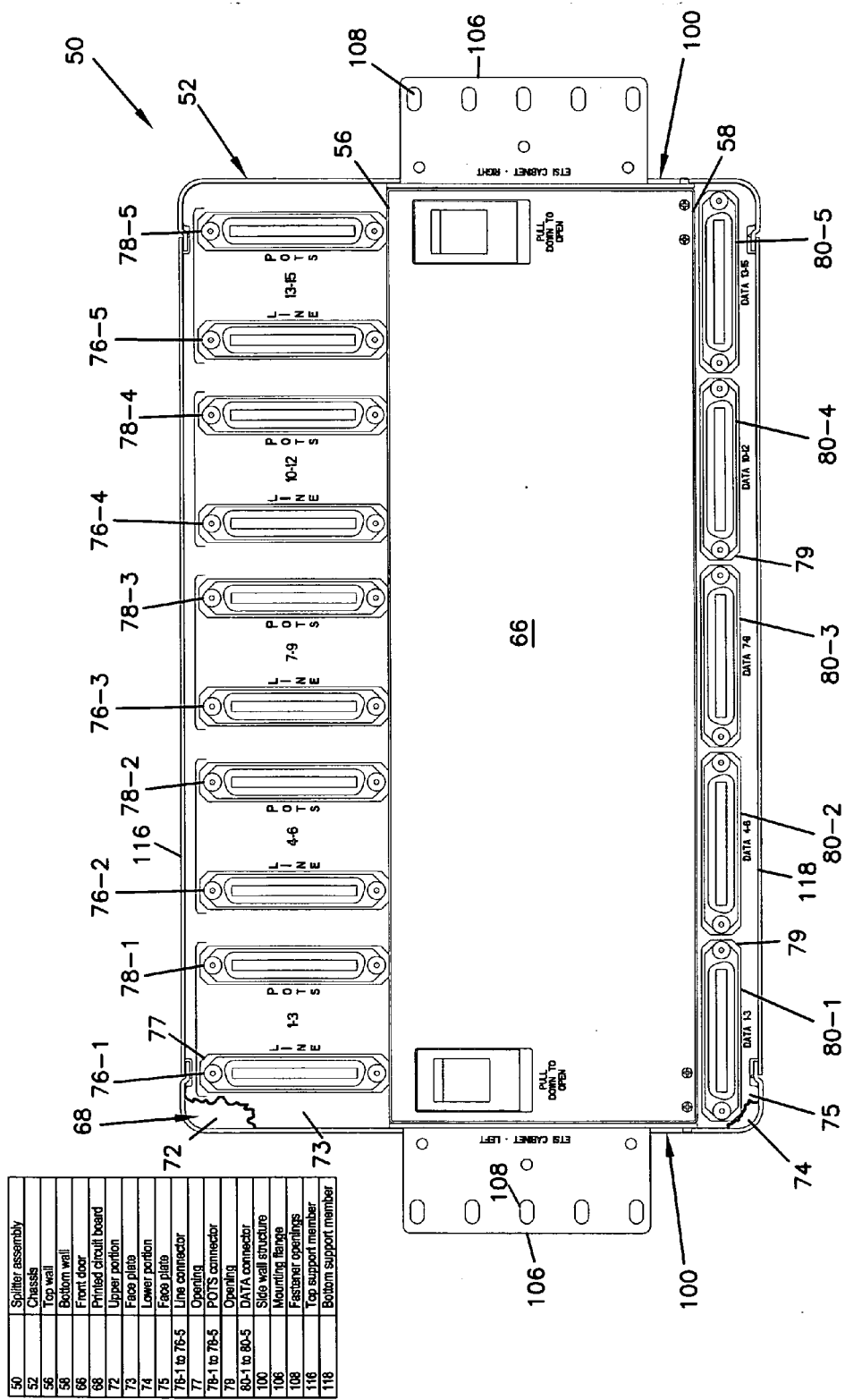
FIG. 6 is a front view of the splitter assembly of FIG. 3.

Referring to FIG. 4–6, the splitter assembly 50 also includes a printed circuit board 68 (also referred to as a "back plane circuit board") mounted at the back end 62 of the card housing 54. The printed circuit board 68 defines a back plane of the splitter assembly 50 and includes a front face 70 (i.e., a front side) that faces toward the front end 60 of the card housing 54. As shown in FIGS. 5 and 6, the printed circuit board 68 includes an upper portion 72 covered by an upper face plate 73 and a lower portion 74 covered by a lower face plate 75. The upper portion 72 of the circuit board 68 extends higher than the top wall 56 of the card housing 54. The lower portion 74 of the printed circuit board 68 extends lower than the bottom wall 58 of the card housing 54. The upper an lower face plates 73 and 75 are respectively integrally connected with the top and bottom walls 56 and 58 of the housing 54.

Figure 9:
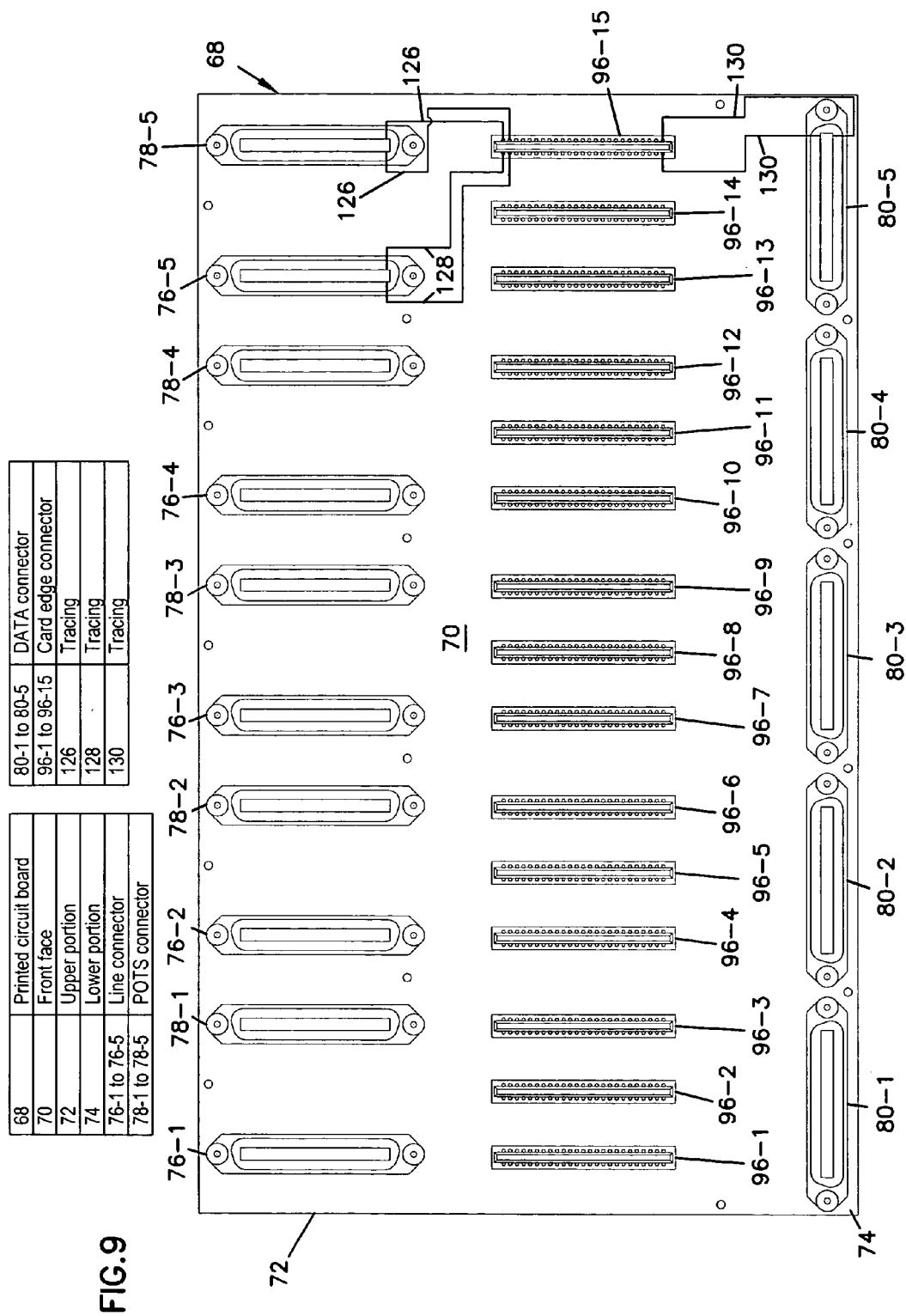
FIG. 9 is a front view of a back plane circuit board of the splitter assembly of FIG. 3.

Referring to FIGS. 5, 6 and 9, a plurality of LINE connectors 76-1 to 76-5 are mechanically coupled to the front face 70 of the circuit board 68 at the upper portion 72. Also, a plurality of POTS connectors 78-1 to 78-5 are mechanically coupled to the front face 70 of the upper portion 72 of the circuit board 68. The LINE and POTS connectors are preferably mechanically coupled directly to the circuit board 68 (e.g., by fasteners such as screws or bolts) and are mounted to extend through rectangular openings 77 (shown in FIG. 5) defined by the upper face plate 73. It will be appreciated that the LINE connectors 76-1 to 76-5 are used to input composite signals (i.e., signals having both data and voice) to the splitter assembly 50, and the POTS connectors 78-1 to 78-5 are used to output voice-only signals from the splitter assembly 50.

The LINE connectors 76-1 to 76-5 and the POTS connectors 78-1 to 78-5 are preferably each positioned in a generally vertical orientation (i.e., the length of each connector preferably extends in a vertical or substantially vertical direction). Also, the LINE connectors 76-1 to 76-5 and the POTS connectors 78-1 to 78-5 collectively are arranged to form a generally horizontal row with the LINE and POTS connectors of the row being alternated with one another.

The splitter assembly 50 also includes a plurality of DATA connectors 80-1 to 80-5 (shown in FIGS. 6 and 9). The DATA connectors 80-1 to 80-5 are preferably directly mechanically coupled (e.g., by fasteners) to the front face of the lower portion 74 of the circuit board 68. As best shown in FIGS. 5 and 6, the DATA connectors 80-1 to 80-5 extend through generally rectangular openings 79 defined by the lower face plate 75. Each of the DATA connectors 80-1 to 80-5 is arranged in a generally horizontal orientation (i.e., the lengths of the connectors extend in a generally horizontal direction). As shown in FIGS. 6 and 9, the DATA connectors 80-1 to 80-5 collectively define a generally horizontal row.

It will be appreciated that the DATA connectors 80-1 to 80-5 are used to output DATA signals from the splitter assembly 50.

The LINE, POTS and DATA connectors are preferably conventional multi-pin telecommunications connectors such as 50 pin telecommunications connectors for use with 25 pair cable. Also, the phrase "mechanically coupled" is intended to include situations where the connectors are fastened or mounted directly to the circuit board 68 as well as situations in which one or more intermediate members are provided between the connectors and the circuit board 68.

Referring now to FIG. 4, the splitter cards 55-1 to 55-15 are mounted within the card housing 54 by inserting the cards through the access opening 64 at the front end 60 of the housing 54. Each of the splitter cards 55-1 to 55-15 includes a plurality of splitters 82 mounted on a circuit board 84. Each of the cards 55-1 to 55-15 also includes a front face plate 86 mounted to the front edge of each circuit board 84. Each of the face plates 86 includes a lower handle 88 located adjacent bottom edges of the face plates 86. Each of the face plates 86 also includes a mounting fastener 90 (e.g., a screw). To secure the splitter cards 55-1 to 55-15 within the card housing 54. The mounting fasteners 90 are preferably threaded within corresponding openings 92 defined by the card housing 54.

As described above, the splitter cards 55-1 to 55-15 are mounted within the card housing by sliding the cards through the front end 60 of the card housing 54. Opposing upper and lower tracks 94 (shown in FIG. 5) receive top and bottom edges of the splitter card circuit boards 84 to guide the splitter cards 55-1 to 55-15 into the card housing 54. When fully inserted within the housing 54, the splitter cards 55-1 to 55-15 are received within card edge connectors 96-1 to 96-15 (best shown in FIG. 9) which are mounted on the back plane circuit board 68. The card edge connectors 96-1 to 96-15 provide an electrical interface between the back plane circuit board 68 and each splitter card 55-1 to 55-15. When mounted within the housing 54, the circuit boards 84 of the splitter cards 55-1 to 55-15 are each positioned in a generally vertical orientation. Similarly, the card edge connectors 96-1 to 96-15 are also vertically oriented (i.e., the lengths of the connectors 96-1 to 96-15 extend in a generally vertical orientation). As best shown in FIG. 9, the card edge connectors 96-1 to 96-15 collectively define a generally horizontal row.

As shown in FIGS. 3–6, the LINE connectors 76-1 to 76-5, the POTS connectors 78-1 to 78-5 and the DATA connectors 80-1 to 80-5 all preferably face in a forward direction (i.e., toward the front end 60 of the card housing 54). This allows all of the connectors to be accessible from the front of the chassis 52. This type of arrangement is ideally suited for use with cabinets since cabinets typically have closed back sides.

The splitters 82 of the splitter assembly 50 can have a number of different configurations. For example, the splitters 82 can include conventional POTS splitter circuits. A conventional POTS splitter circuit functions to split a composite signal (i.e., a mixed voice/data signal) into two composite signals. One of the split composite signals is typically passed through one or more low pass filters capable of passing the relatively lower frequency voice content of the composite signal (e.g., less than about 4 kilohertz) and rejecting the composite signal content above the voice band (e.g., 30 kilohertz and above). The other split composite signal can be passed through a high pass filter that passes the composite signal content associated with the data band (e.g., about 30 kilohertz and above), and rejects the relatively lower frequency voice content of the composite signal. Alternatively, the other split signal can be unfiltered such that the signal remains a composite signal. For such an embodiment, it is assumed that the DSLAM or other digital multi-plexer that ultimately receives the composite signal will provide any required high-pass filter elements to remove the relatively low frequency voice signal content of the composite signal. It will further be appreciated that ISDN filter circuits could also be used. As shown in FIG. 4, 8 splitters 82 are provided per splitter card.

Referring to FIG. 5, the chassis 52 of the splitter assembly 50 includes two opposing side wall structures 100 located on the left and right sides of the chassis 52. The side wall structures 100 include front portions 102 that enclose the sides of the card housing 54. The front portions 102 extend vertically between the top and bottom walls 56 and 58 of the housing 54. Adjacent the side wall structures 100, the top and bottom walls 56 and 58 include rounded portions 104. The rounded portions 104 provide smooth transitions for bending cables from a generally horizontal orientation to a generally vertical orientation. In this manner, the rounded portions 104 assist in preventing kinking of cables during routing.

Referring to FIG. 3, mounting flanges 106 are connected to the side wall structures 100 adjacent the front end 60 of the card housing 54. The mounting flanges 106 are adapted for allowing the splitter assembly 50 to be fastened (e.g., by screws or bolts) to a conventional rack or cabinet 150 (see FIGS. 10 and 11 where only front portions of the cabinet are shown). The flanges 106 define fastener openings 108 adapted to align with corresponding openings 154 defined by the cabinet 150. To secure the splitter assembly 50 to the cabinet 150, fasteners 151 are mounted through the aligned openings 108 and 154. As shown in FIG. 4, the mounting flanges 106 have a height less than the height of the back plane of the chassis 52.

Figure 7:
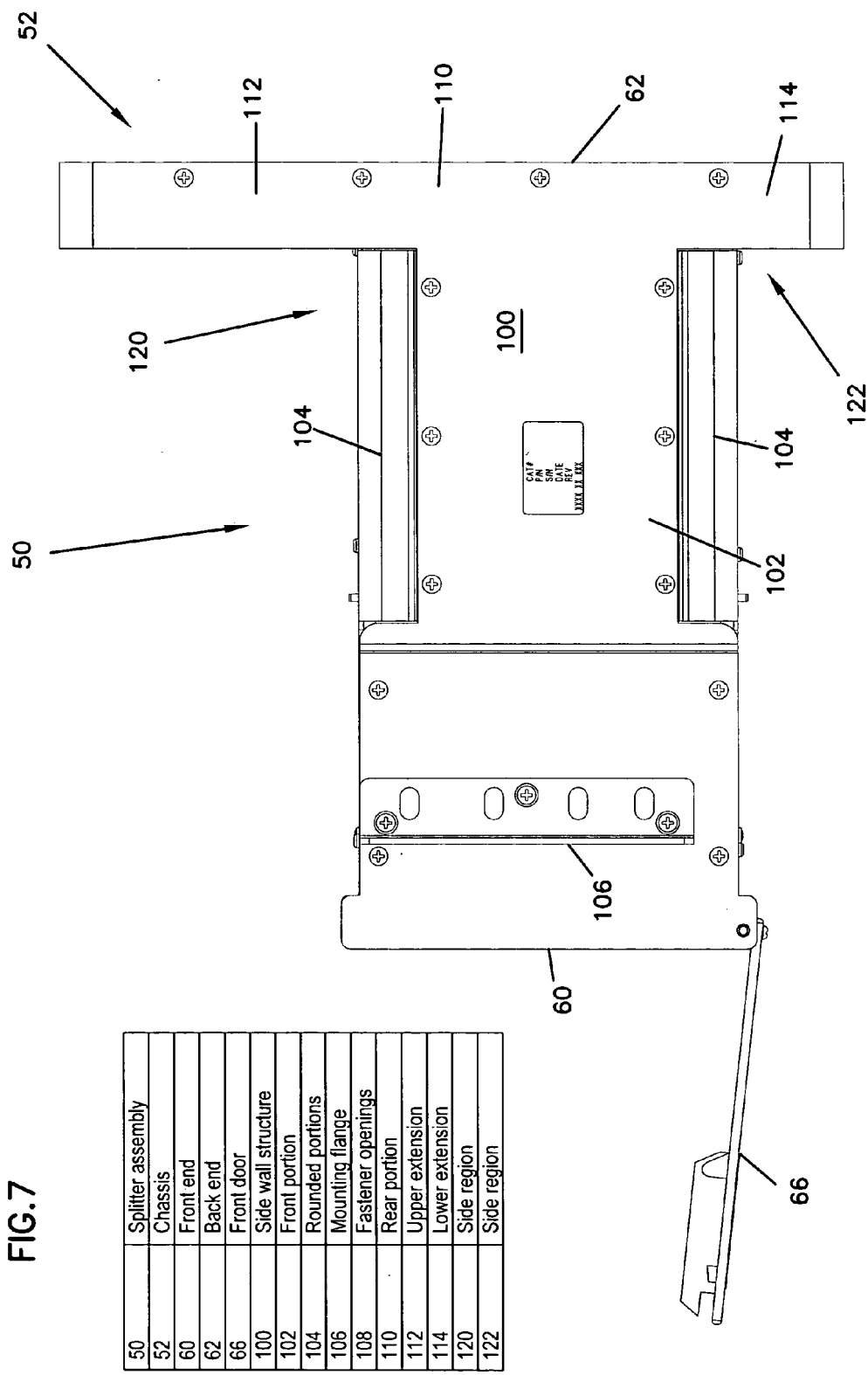
FIG. 7 is a side view of the splitter assembly of FIG. 3.

Looking now to FIG. 7, each side wall structure 100 also includes a rear portion 110 located adjacent to the back end 62 of the card housing 54. The rear portion 110 depicted in FIG. 7 includes upper and lower extensions 112 and 114 that respectively project above and below the corresponding front portion 102 of the side wall structure 100. The rear portions 110 preferably have heights that are substantially larger than the heights of the front portions 102. Additionally, while FIG. 7 shows the front portion 102 and the rear portion 110 formed as a single integral piece, separate pieces could also be used to form the front and rear portions 102 and 110.

Referring to FIGS. 3 and 4, the rear portions 110 extend along the entire height of the back plane circuit board 68. The rear portions 110 are interconnected by top and bottom support members 116 and 118. The rear portions 110 of the side wall structures 100 cooperate with the top and bottom support members 116 and 118 to form a reinforcing frame that extends about the perimeter of the back plane circuit board 68.

For many applications, it is desirable to route cables laterally (i.e., in a direction extending generally across the width of the chassis 52) from the LINE, POTS and DATA connectors to the sides of the chassis 52. At the sides of the chassis 52, the cables are preferably routed in a generally vertical orientation. To allow cables to be routed laterally to the LINE connectors 76-1 to 76-5 and the POTS connectors 78-1 to 78-5, the chassis 52 includes upper open side regions 120 (shown in FIGS. 3, 4, 5 and 7) for allowing lateral routing of cables. The upper open side regions 120 are located above the top wall 56 of the card housing 54.

Additionally, at least portions of the upper open side regions 120 are located adjacent to the back end 62 of the card housing 54. The phrase "adjacent to the back end of the card housing" will be understood to mean that at least portions of the upper open side regions 120 are located at the back half of the chassis 52. Preferably, the upper open side regions 120 are located immediately in front of the back plane circuit board 68.

Referring to still to FIGS. 3, 4, 5 and 7, the chassis 52 also defines lower open side regions 122 for allowing cables connected to the DATA connectors 80-1 to 80-5 to be routed laterally to the sides of the chassis 52. The lower open side regions 122 are located below the bottom wall 58 of the card housing 54. Preferably, at least portions of the open lower side regions are located adjacent to the back end 62 of the housing 54.

Figure 8:
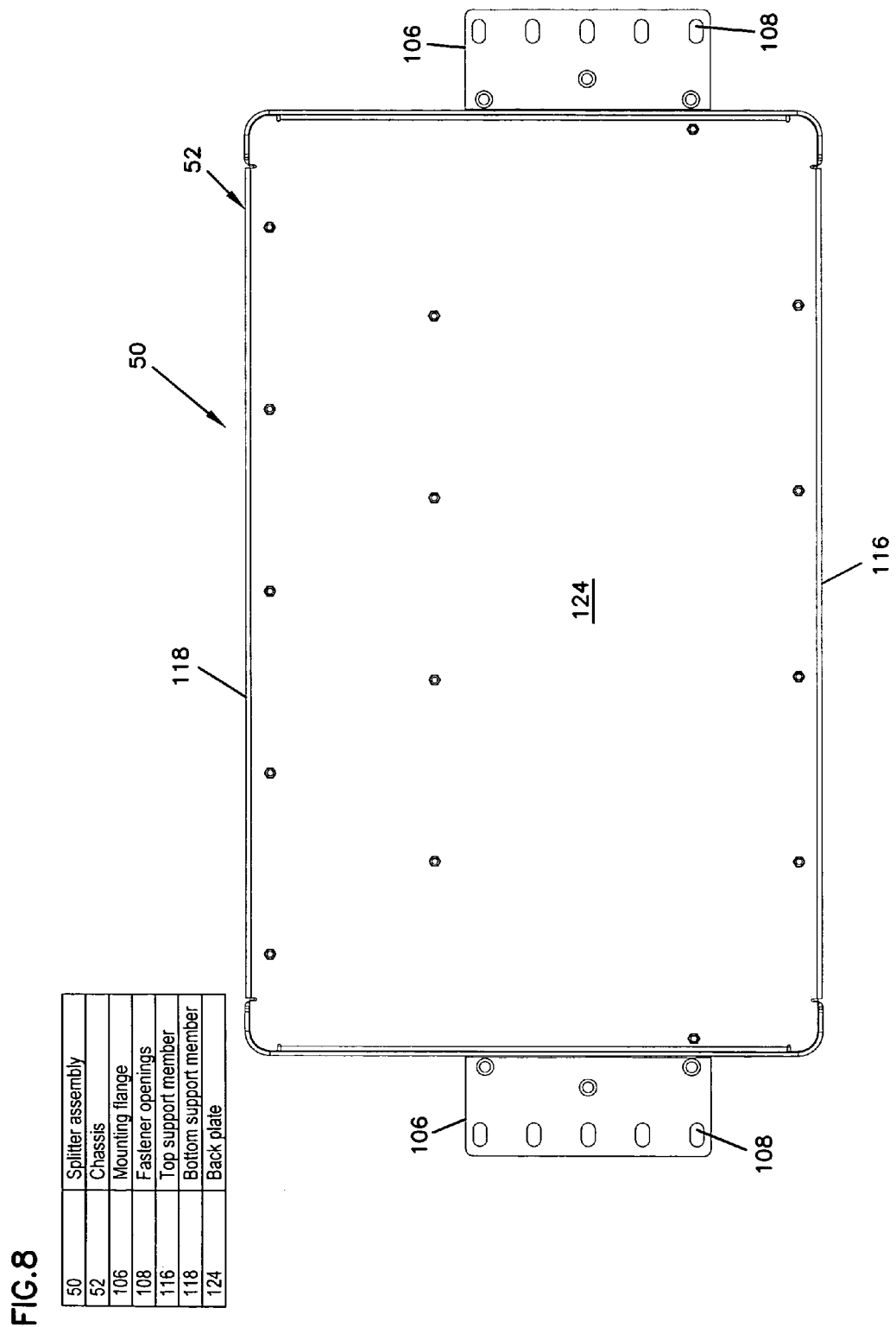
FIG. 8 is a back view of the splitter assembly of FIG. 3.

Referring to FIG. 8, the back of the chassis 52 is enclosed by a back plate 124 that is substantially the same size as the back plane circuit board 68. As shown in FIG. 5, the top and bottom support members 116 and 118 are integrally connected with the back plate 124. The back plate 124 is fastened to the side walls 100 and top and bottom face plates 73 and 75 of the chassis 52 by conventional fasteners. Since the LINE connectors 76-1 to 76-5, the POTS connectors 78-1 to 78-5 and the DATA connectors 80-1 to 80-5 are all accessed from the front of the chassis 52, such connectors are not visible from the back view of FIG. 8.

FIG. 9 shows a front view of the back plane circuit board 68 in isolation from the chassis 52. The back plane circuit board 68 preferably includes tracings for electrically connecting the LINE connectors 76-1 to 76-5, the POTS connectors 78-1 to 78-5 and the DATA connectors 80-1 to 80-5 to the card edge connectors 96-1 to 96-15. The splitter assembly 50 preferably includes 120 different circuits. In FIG. 9, a schematic tracing layout for one of the 120 circuits has been shown. The tracing layout includes POTS tracings 126 that electrically connect a pair of pins of the POTS connector 78-5 to a corresponding pair of contacts on the card edge connector 96-15. The tracing layout also includes LINE tracings 128 that electrically connect a pair of pins of the LINE connector 76-5 to a corresponding pair of contacts of the card edge connector 96-15. The tracing layout further includes data tracings 130 that electrically connect a pair of pins of the DATA connector 80-5 to a corresponding pair of contacts of the card edge connectors 96-15. It will be appreciated that the LINE, POTS and DATA connectors are arranged in sets. For example, connectors 76-1, 78-1 and 80-1 form a first set, connectors 76-2, 78-2 and 80-2 form a second set, connectors 76-3, 78-3 and 80-3 form a third set, connectors 76-4, 78-4 and 80-4 form a fourth set, and connectors 76-5, 78-5 and 80-5 form a fifth set. Each set of connectors is adapted for handling 24 separate circuits. The circuits for the first set of connectors are routed through card edge connectors 96-1 to 96-3; the circuits for the second set of connectors are routed through card edge connectors 96-4 to 96-6; the circuits for the third set of connectors are routed through card edge connectors 96-7 to 96-9; the circuits for the fourth set of connectors are routed through card edge connectors 96-10 to 96-12; and the circuits for the second set of connectors are routed through card edge connectors 96-13 to 96-15.

FIGS. 10A and 10B are additional schematic depictions of the tracing layout shown in FIG. 9. In FIG. 10A, the splitter card 55-15 is shown connected with the card edge connector 96-15. With the interface between the splitter card 55-15 and the card edge connector 96-15, LINE signals inputted through LINE connector 76-5 are directed through tracings 128 to card edge connector 96-15. From card edge connector 96-15, the signal is conveyed to splitter 82 of splitter card 55-15. At splitter 82, the LINE signal is split into separate voice and data signals. The voice signal is directed back through card edge connector 96-15 to tracings 126. Tracings 126 carry the voice signal to POTS connector 78-5 where the voice signal is output from the splitter assembly 50. The data component of the LINE signal is directed from splitter 82 to card edge connector 96-15. From card edge connector 96-15, the data signal is carried by tracings 130 to data connector 80-5. At data connector 80-5, the data signal is output from the splitter assembly 50.

FIG. 10B shows the splitter card 55-15 disconnected from the card edge connector 96-15. The splitter assembly 50 is preferably adapted for supporting lifeline functions. Therefore, the card edge connector 96-15 (which is representative of all of the card edge connectors 96-1 to 96-15) preferably includes contacts that automatically close upon removal of the splitter card 55-15. When closed, the contacts provide electrical connections between the LINE tracings 128 and the POTS tracings 126. Thus, even when the card 55-15 is removed from the chassis 52, lifeline function is fully supported. Preferably, the contacts in the card edge connector 96-15 are "make-before-break" contacts which close before contact has been broken with the splitter card 55-15. Thus, lifeline functions are not interrupted even as the card 55-15 is in the process of being disconnected from the card edge connector 96-15.

Figure 11:
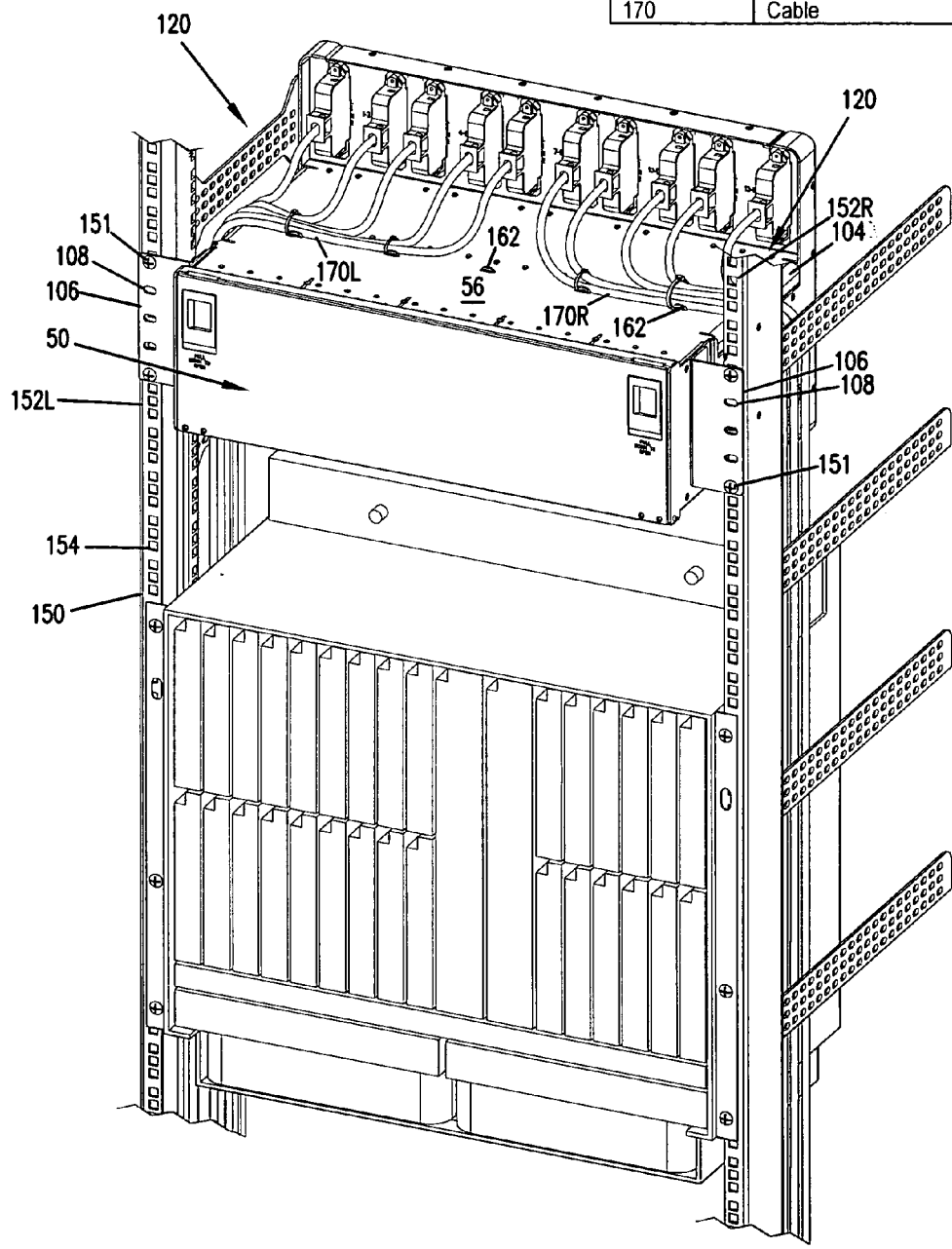
FIG. 11 shows the splitter assembly of FIG. 3 mounted in a rack, preferred cable routings for the POTS and LINE cables are also shown.
Figure 12:
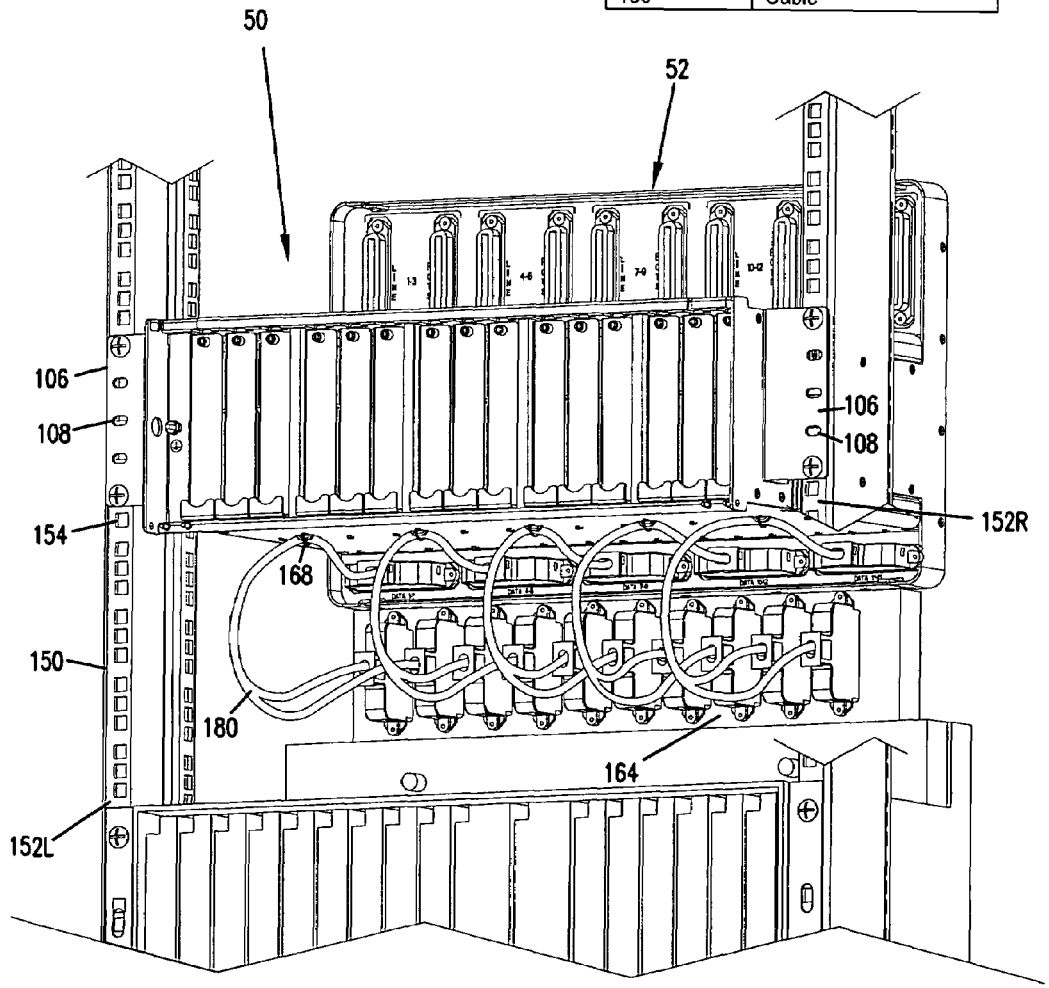
FIG. 12 shows the splitter assembly of FIG. 3 mounted in a rack, a preferred cable routing configuration for the DATA cables is also shown.

FIGS. 11 and 12 show the splitter assembly 50 mounted within the telecommunications cabinet 150. The cabinet includes a bay in which the splitter assembly 50 is mounted. The bay is defined by left and right channel members 152L and 152R. The channel members 152L and 152R define fastener openings 154. The splitter assembly 50 is mounted to the front side of the cabinet 150. For example, the mounting flanges 106 are shown fastened to the front sides of the channel members 152L and 152R by fasteners.

FIG. 11 shows preferred cable layout for cables connected to the LINE connectors 76-1 to 76-5 and the POTS connectors 78-1 to 78-5. As shown in FIG. 10, cables 170L corresponding to connectors 76-1, 78-1, 76-2, 78-2 and 76-3 are routed laterally in a leftward direction through the left upper open side region 120 of the chassis 52. After passing through the left upper open side region 120, the cables 170L are bent around the left rounded portions 104 of the top wall 56 and are routed vertically downwardly along a vertical channel defined by the cabinet 150.

Cables 170R corresponding to the connectors 78-3, 76-4, 78-4, 76-5 and 78-5 are routed laterally to the right side of the chassis 52. At the right side of the chassis 52, the cables 170R are passed through the right upper open side region 120 of the chassis 52. As the cables 170R pass through the open side region 120 the cables 170R are curved downwardly about the right rounded portion 104 of the chassis 52. The cables 170R are then routed vertically downwardly along a channel defined by the cabinet 150.

Still referring to FIG. 11, the top surface of the top wall 56 includes structure for managing cables. For example, a plurality of lances 162 (i.e., tie-down loops) are provided on the top surface of the top wall 56. As shown in FIG. 10, the lances facilitate tying down groups of cable to the top wall 56.

FIG. 12 shows a preferred routing layout for cables 180 connected to the DATA connectors 80-1 to 80-5. Preferably, the splitter assembly 50 is mounted on the rack 150 at a position directly above a DSLAM 164. Thus, since the DATA connectors 80-1 to 80-5 are located at the bottom of the chassis 52, the DATA connectors are in close proximity to the DSLAM 164. As shown in FIG. 11, the cables 180 are looped from the DATA connectors 80-1 to 80-5 to the DSLAM 164. Cable management structures in the form of lances 168 are provided on the underside of the bottom wall 58 of the card housing 54. In other embodiments, cables connected to the DATA connectors 80-1 to 80-5 can be routed laterally through the lower open side regions 122 in a manner similar to the cables 170L and 170R shown passing through the upper open side regions 120 of the chassis 52 in FIG. 11.

The various aspects of the present invention provide a splitter assembly having a relatively low number of parts, which is relatively light and can be easily and quickly assembled. Further, by providing the DATA connectors 80-1 to 80-5 at the bottom of the chassis 52, short lengths of cables can be used to provide connections with the DSLAM 164. Further, by mechanically coupling the LINE, POTS and DATA connectors directly to the front face of the back plane circuit board 68, a relatively small number of parts can be utilized. Moreover, the open sides of the chassis 52 provided above and below the card housing 54 enhance cable management. Cable management is further enhanced through the use of cable management structures provided on the top side of the top wall 56 and the bottom side of the bottom wall 58.

With regard to the foregoing description, it is to be understood that changes may be made in detail without departing from the scope of the present invention. It is intended that the specification and depicted aspects of the invention may be considered exemplary, only, with a true scope and spirit of the invention being indicated by the broad meaning of the following claims.

What is claimed is:

1. A telecommunications device comprising:
   a chassis including a card housing containing a plurality of splitter cards, the housing including top and bottom walls and also including front and back ends and opposing sides, the front end defining an access opening for allowing the splitter cards to be inserted into or removed from the card housing;
   a circuit board positioned at the back end of the housing, the circuit board including a major front face that faces toward the front end of the housing, the circuit board also including an upper portion that extends higher than the top wall of the housing and a lower portion that extends lower than the bottom wall of the housing;
   a plurality of card edge connectors for providing electrical connections with the splitter cards, the card edge connectors being located within the card housing and being mechanically coupled to the front side of the circuit board;
   first telecommunications connectors mechanically coupled to the major front face of the circuit board at the upper portion of the circuit board;
   second telecommunications connectors mechanically coupled to the major front face of the circuit board at the lower portion of the circuit board;
   the chassis defining upper and lower open side regions for allowing cables to be routed laterally from adjacent the sides of the chassis to the first and second telecommunications connectors, the upper and lower open side regions being located adjacent to the back end of the housing, the upper open side regions being located above the top wall of the card housing and the lower open side regions being located below the bottom wall of the card housing; and
   the card edge connectors being electrically connected to the first and second telecommunications connectors by the circuit board.

2. The telecommunications device of claim 1, further comprising the splitter cards, the splitter cards being mounted within the card housing and being electrically connected to the circuit board by the card edge connectors.

3. The telecommunications device of claim 2, wherein the first telecommunications connectors include LINE and POTS connectors, and the second telecommunications connectors include DATA connectors.

4. The telecommunications device of claim 3, wherein the LINE, POTS and DATA connectors are 50 pin connectors adapted for use with 25-pair cables.

5. The telecommunications device of claim 1, wherein the telecommunications connectors are adapted for use with multi-pair cables.

6. The telecommunications device of claim 5, wherein the telecommunications connectors are 50 pin connectors adapted for use with 25-pair cables.

7. The telecommunications device of claim 1, wherein the first telecommunications connectors include LINE and POTS connectors, and the second telecommunications connectors include DATA connectors.

8. The telecommunications device of claim 1, further comprising cable management structure located on a top side of the top wall of the card housing.

9. The telecommunications device of claim 8, wherein the cable management structure comprises a plurality of tie-down loops.

10. The telecommunications device of claim 1, wherein the opposing sides of the chassis are defined by side wall structures, the side wall structures including front portions that enclose the card housing and rear portions for reinforcing the circuit board, the rear portions including upper and lower extensions that respectively project above and below the front portions of the of the side wall structures.

11. The telecommunications device of claim 10, wherein the chassis includes a circuit board frame that extends about a perimeter of the circuit board, side portions of the circuit board frame being defined by the rear portions of the side wall structures.

12. A telecommunications device comprising:
   a chassis including a housing, the housing including top and bottom walls and also including front and back ends and opposing sides;
   a circuit board positioned at the back end of the housing, the circuit board including a major front face that faces toward the front end of the housing, the circuit board also including an upper portion that extends higher than the top wall of the housing and a lower portion that extends lower than the bottom wall of the housing;
   splitter devices mounted within the housing;
   first telecommunications connectors mechanically coupled to the major front face of the circuit board at the upper portion of the circuit board;
   second telecommunications connectors mechanically coupled to the major front face of the circuit board at the lower portion of the circuit board;
   the chassis defining upper open side regions for allowing cables to be routed laterally from adjacent the sides of the chassis to the first telecommunications connectors, the upper open side regions being located adjacent to the back end of the housing, and the upper open side regions being located above the top wall of the card housing.

13. The telecommunications device of claim 12, wherein the first telecommunications connectors include LINE and POTS connectors, and the second telecommunications connectors include DATA connectors, the LINE, POTS and DATA connectors being electrically connected to the splitter devices at least in part by the circuit board.

14. The telecommunications device of claim 13, wherein the LINE, POTS and DATA connectors are 50 pin connectors adapted for use with 25-pair cables.

15. The telecommunications device of claim 12, wherein the telecommunications connectors are adapted for use with multi-pair cables.

16. The telecommunications device of claim 15, wherein the telecommunications connectors are 50 pin connectors adapted for use with 25-pair cables.

17. The telecommunications device of claim 12, further comprising cable management structure located on a top side of the top wall of the card housing.

18. The telecommunications device of claim 17, wherein the cable management structure comprises a plurality of tie-down loops.

19. The telecommunications device of claim 12, wherein the opposing sides of the chassis are defined by side wall structures, the side wall structures including front portions that enclose the card housing and rear portions for reinforcing the circuit board, the rear portions including upper and lower extensions that respectively project above and below the front portions of the of the side wall structures.

20. The telecommunications device of claim 19, wherein the chassis includes a circuit board frame that extends about a perimeter of the circuit board, side portions of the circuit board frame being defined by the rear portions of the side wall structures.

21. A telecommunications device comprising:
a chassis including a housing having opposing first and second walls and also including front and back ends, one of the first and second walls being a top wall, the other of the first and second walls being a bottom wall;
a circuit board positioned at the back end of the housing, the circuit board including a major front face that faces toward the front end of the housing, the circuit board also including a first portion that extends generally perpendicularly beyond the first wall of the housing;
a plurality of splitter devices positioned within the housing;
telecommunications connectors mechanically coupled to the major front face of the circuit board at the first portion of the circuit board; and
cable management structure located at an outer surface of the first wall of the housing, the cable management structure being provided to manage lateral side cables routed to the telecommunications connector.

22. The telecommunications device of claim 21, wherein the cable management structure comprises a plurality of tie-down loops.

23. The telecommunications device of claim 21, wherein the telecommunications connectors are 50 pin connectors adapted for use with 25-pair cables.

24. The telecommunications device of claim 21, wherein the telecommunications connectors include POTS and LINE connectors that are electrically connected to the splitter devices.

25. The telecommunications device of claim 21, wherein the first wall is a top wall and the second wall is a bottom wall, wherein the first portion of the circuit board extends higher than the top wall, and wherein the cable management structure is provided on a top surface of the top wall.

26. The telecommunications device of claim 25, wherein the cable management structure includes a plurality of tie-down loops.

27. The telecommunications device of claim 21, wherein the first wall is a bottom wall and the second wall is a top wall, wherein the first portion of the circuit board extends lower than the bottom wall, and wherein the cable management structure is provided on a bottom surface of the bottom wall.

28. The telecommunications device of claim 27, wherein the cable management structure includes a plurality of tie-down loops.

29. A telecommunications device comprising:
a chassis including a housing, the housing including top and bottom walls and also including front and back ends and opposing sides;
a circuit board positioned at the back end of the housing, the circuit board including a major front side that faces toward the front end of the housing, the circuit board also including an extension portion that extends generally perpendicularly beyond one of the top and bottom walls of the housing;
splitter devices positioned within the housing;
telecommunications connectors mechanically coupled to the major front side of the circuit board at the extension portion of the circuit board; and
the chassis defining open side regions for allowing cables to be routed laterally from adjacent the sides of the chassis to the telecommunications connectors, the open side regions being located adjacent to the back end of the chassis.

30. The telecommunications device of claim 29, wherein the telecommunications connectors are 50 pin connectors adapted for use with 25-pair cables.

31. The telecommunications device of claim 29, wherein the telecommunications connectors include POTS and LINE connectors that are electrically connected to the splitter devices.

32. The telecommunications device of claim 29, wherein the telecommunications connectors include DATA connectors that are electrically connected to the splitter devices.

* * * * *

UNITED STATES PATENT AND TRADEMARK OFFICE
CERTIFICATE OF CORRECTION

| | |
|---|---|
| PATENT NO. | : 7,257,223 B2 |
| APPLICATION NO. | : 09/853035 |
| DATED | : August 14, 2007 |
| INVENTOR(S) | : Sajadi et al. |

It is certified that error appears in the above-identified patent and that said Letters Patent is hereby corrected as shown below:

Col. 11, line 52, claim 21: "telecommunications connector." should read --telecommunications connectors.--

Signed and Sealed this

Twenty-fifth Day of March, 2008

JON W. DUDAS
*Director of the United States Patent and Trademark Office*